United States Patent
M P et al.

(10) Patent No.: US 12,555,187 B2
(45) Date of Patent: Feb. 17, 2026

(54) CLIENT-SERVER MEDICAL IMAGE STACK RETRIEVAL AND DISPLAY

(71) Applicant: GE Precision Healthcare LLC, Wauwatosa, WI (US)

(72) Inventors: Samji M P, Karnataka (IN); Hariom Singh Kuntal, Vernon Hills, IL (US); Sayooj Cyriac, Arlington Heights, IL (US); Yongjian Bao, Vernon Hills, IL (US); Charlotte Roche Hoo, Chicago, IL (US)

(73) Assignee: GE Precision Healthcare LLC, Wauwatosa, WI (US)

( * ) Notice: Subject to any disclaimer, the term of this patent is extended or adjusted under 35 U.S.C. 154(b) by 307 days.

(21) Appl. No.: 18/146,090

(22) Filed: Dec. 23, 2022

(65) Prior Publication Data

US 2024/0212096 A1 Jun. 27, 2024

(51) Int. Cl.
*G06T 3/4092* (2024.01)
*G06T 7/70* (2017.01)
*G16H 30/40* (2018.01)
*G06F 3/0485* (2022.01)

(52) U.S. Cl.
CPC .............. *G06T 3/4092* (2013.01); *G06T 7/70* (2017.01); *G16H 30/40* (2018.01); *G06F 3/0485* (2013.01); *G06T 2200/24* (2013.01); *G06T 2207/30004* (2013.01)

(58) Field of Classification Search
None
See application file for complete search history.

(56) References Cited

U.S. PATENT DOCUMENTS

| | | | |
|---|---|---|---|
| 2007/0130165 A1* | 6/2007 | Sjoblom | G06F 16/50 |
| 2009/0319473 A1* | 12/2009 | Rao | G06F 16/172 |
| 2012/0007866 A1* | 1/2012 | Tahan | G16H 30/20 |
| | | | 345/428 |
| 2021/0327061 A1* | 10/2021 | Clymer | G06V 20/698 |
| 2023/0221853 A1* | 7/2023 | Eom | G06F 3/0485 |
| | | | 715/786 |

* cited by examiner

*Primary Examiner* — Yanna Wu (57) ABSTRACT

Techniques for medical image stack retrieval from a server and display by a client are presented. The techniques can include: designating an aperture for viewing the medical image stack; retrieving, from the server, high resolution image data for inside a respective aperture region of each of a plurality of images of the medical image stack; retrieving, from the server, context image data for outside the respective aperture region for each of the plurality of images of the medical image stack; and displaying a plurality of display images derived from the plurality of images of the medical image stack, each of the display images comprising a high resolution image portion inside the respective aperture region and a context image portion outside the respective aperture region, where the high resolution image portion corresponds to the high resolution image data and the context image portion corresponds to the context image data.

21 Claims, 6 Drawing Sheets

CLIENT-SERVER MEDICAL IMAGE STACK RETRIEVAL AND DISPLAY

FIELD

This disclosure relates generally to client-server communications and medical image display.

BACKGROUND

Medical image viewers on client computers provide the ability to scroll through stacks of related medical images retrieved from server computers. Users often desire to navigate through these images at fast speeds, and sometimes need to scroll images in multiple image stacks simultaneously. When a user scrolls through images within a viewport on a client computer, the next image is loaded over a network from a server computer and rendered before it can be displayed on the client computer. Scrolling speed is often bottlenecked by image load and rendering speeds. Depending on network conditions, CPU availability, and image size, the rate at which the user scrolls may be greater than the rate at which the rendered image is available, slowing scroll speeds.

SUMMARY

According to various embodiments, a method of medical image stack retrieval from a server and display by a client, is presented. The method includes: designating, at the client, an aperture for viewing the medical image stack; retrieving, by the client and from the server, high resolution image data for inside a respective aperture region of each of a plurality of images of the medical image stack; retrieving, by the client and from the server, context image data for outside the respective aperture region for each of the plurality of images of the medical image stack; and displaying, by the client, a plurality of display images derived from the plurality of images of the medical image stack, each of the display images including a high resolution image portion inside the respective aperture region and a context image portion outside the respective aperture region, where the high resolution image portion corresponds to the high resolution image data and the context image portion corresponds to the context image data.

Various optional features of the above method embodiments include the following. At least one of the retrieving the high resolution image data or the retrieving context image data may include: sending, from the client to the server, a request for image data; receiving, by the client from the server, a plurality of hash values corresponding to a plurality of image portions; determining, by the client, a subset of the plurality of hash values corresponding to image portions not cached by the client; sending, from the client to the server, the subset of the plurality of hash values; and receiving, by the client from the server, data for a plurality of image portions corresponding to the subset of the plurality of hash values. The medical image stack may include a sequence of three dimensional imaging slices. The displaying may include displaying a cine sequence of the plurality of display images. The designating the aperture may include receiving a graphical user designation. The designating the aperture may include automatically designating the aperture. The automatically designating the aperture may include automated background identification to identify a context image portion outside respective aperture regions. A location of the respective aperture region may change among the plurality of display images. The automatically designating the aperture may include tracking, using artificial intelligence, a location of the respective aperture region among the plurality of display images. The context image portion may include a fixed high resolution image portion for multiple of the display images. The context image portion may include a low resolution image portion of a respective image of the medical image stack.

According to various embodiments, a system for medical image stack retrieval from a server and display by a client computer is presented. The system includes the client computer, the client computer including an electronic processor and persistent storage including instructions that, when executed by the electronic processor, cause the electronic processor to perform actions including: designating, at the client computer, an aperture for viewing the medical image stack; retrieving, by the client computer and from the server, high resolution image data for inside a respective aperture region of each of a plurality of images of the medical image stack; retrieving, by the client computer and from the server, context image data for outside the respective aperture region for each of the plurality of images of the medical image stack; and displaying, by the client computer, a plurality of display images derived from the plurality of images of the medical image stack, each of the display images including a high resolution image portion inside the respective aperture region and a context image portion outside the respective aperture region, where the high resolution image portion corresponds to the high resolution image data and the context image portion corresponds to the context image data.

Various optional features of the above system embodiments include the following. At least one of the retrieving the high resolution image data or the retrieving context image data may include: sending, from the client computer to the server, a request for image data; receiving, by the client computer from the server, a plurality of hash values corresponding to a plurality of image portions; determining, by the client computer, a subset of the plurality of hash values corresponding to image portions not cached by the client computer; sending, from the client computer to the server, the subset of the plurality of hash values; and receiving, by the client computer from the server, data for a plurality of image portions corresponding to the subset of the plurality of hash values. The medical image stack may include a sequence of three dimensional imaging slices. The displaying may include displaying a cine sequence of the plurality of display images. The designating the aperture may include receiving a graphical user designation. The designating the aperture may include automatically designating the aperture. The automatically designating the aperture may include automated background identification to identify a context image portion outside respective aperture regions. A location of the respective aperture region may change among the plurality of display images. The automatically designating the aperture may include tracking, using artificial intelligence, a location of the respective aperture region among the plurality of display images. The context image portion may include a fixed high resolution image portion for multiple of the display images. The context image portion may include a low resolution image portion of a respective image of the medical image stack.

Combinations, (including multiple dependent combinations) of the above-described elements and those within the specification have been contemplated by the inventors and may be made, except where otherwise indicated or where contradictory.

BRIEF DESCRIPTION OF THE DRAWINGS

Various features of the examples can be more fully appreciated, as the same become better understood with reference to the following detailed description of the examples when considered in connection with the accompanying figures, in which.

DESCRIPTION OF THE EXAMPLES

| Element | Reference Number |
| --- | --- |
| 100 | system |
| 110 | client computer |
| 112 | processors |
| 114 | persistent storage |
| 116 | display |
| 118 | input device |
| 120 | server computer |
| 122 | processors |
| 124 | persistent storage |
| 130 | network |
| 200 | image stack display |
| 202 | viewport |
| 204 | aperture image portion |
| 206 | context image portion |
| 302 | image display |
| 304 | context image portion |
| 306 | aperture image portion |
| 308 | viewport |
| 310 | viewport |
| 422 | image display |
| 424 | aperture image portion |
| 426 | context image portion |
| 502 | image display |
| 510 | viewport |
| 512 | aperture image portion |
| 514 | context image portion |
| 520 | viewport |
| 522 | aperture image portion |
| 524 | context image portion |
| 602 | image display |
| 610 | context image portion |
| 612 | image square |
| 620 | aperture image portion |
| 622 | image square |
| 702 | image display |
| 710 | context image portion |
| 712 | image square |
| 720 | aperture image portion |
| 722 | image square |
| 800 | method |
| 802 | communication |
| 804 | communication |
| 806 | communication |
| 808 | communication |
| 810 | action |
| 900 | file |
| 901 | block |
| 902 | block |
| 903 | block |
| 904 | block |
| 1010 | file |
| 1011 | block |
| 1012 | block |
| 1013 | block |
| 1020 | file |
| 1022 | block |
| 1024 | block |
| 1025 | block |
| 1030 | file |
| 1035 | block |
| 1036 | block |
| 1037 | block |
| 1100 | method |
| 1102 | operation |
| 1104 | operation |
| 1106 | operation |
| 1108 | operation |

Reference will now be made in detail to example implementations, illustrated in the accompanying drawings. Wherever convenient, the same reference numbers will be used throughout the drawings to refer to the same or like parts. In the following description, reference is made to the accompanying drawings that form a part thereof, and in which is shown by way of illustration specific exemplary examples in which the invention may be practiced. These examples are described in sufficient detail to enable those skilled in the art to practice the invention and it is to be understood that other examples may be utilized and that changes may be made without departing from the scope of the invention. The following description is, therefore, merely exemplary.

Some examples improve image stack scrolling speed by minimizing the amount of image pixel data to be loaded over a network connection by a client from a server, while providing sufficient image stack content and context for review. Some examples apply an aperture to the image stack and only load high resolution pixel data within the aperture region for some (or all) images in the stack. The use of an aperture restricts the amount of image data downloaded from the server and provides high resolution image scrolling for an image stack only inside of image areas defined by the aperture. Some examples use the existing network communication channel capacity to transmit more images, with a reduced amount of data per image, than otherwise possible with entire high resolution images, resulting in a higher scrolling rate.

Some examples reduce client-server image data transfer by using image block hash values. According to some examples, the client and server exchange hash values so as to transfer only the image data blocks that are not already cached by the client.

Thus, various examples provide an improvement in the way a client-server computer system operates, increasing the speed at which image stack data can be obtained and displayed.

By providing faster navigation through medical image stacks, the time to diagnosis can be significantly improved. In addition, medical images can be acquired as a temporal sequence (e.g., a beating heart), and some examples provide temporal-distortion-free playback of image sequences with a high acquisition rate. Specific use cases include the following. Some examples allow users to display viewports on high-resolution monitors without having to wait for the data to load while scrolling. Some examples allow cardiologists to play a cine sequence at a faster frame rate, which is useful for pediatric cardiac imaging where the cine frame rate (e.g., 90-120 fps) may correspond to the increased pediatric heart rate. Further, as ultra-low dose technology for radiation modalities improves, the amount of acquired images will increase, and with it the need for faster navigation during image review. Some examples provide such increased image navigation during image scrolling.

These and other features and advantages are shown and described presently in reference to FIGS. 1-11.

Figure 1:
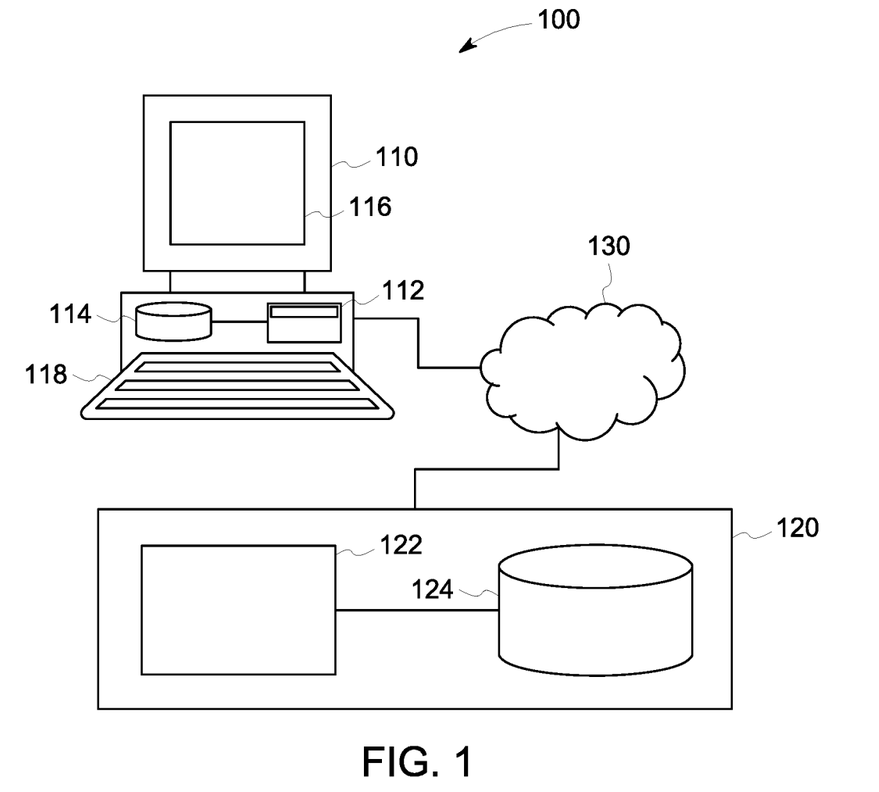
FIG. 1 illustrates a client-server system according to various examples.

FIG. 1 illustrates a client-server system 100 according to various examples. The system 100 includes a client computer 110 and a server computer 120. The client computer 110 is communicatively coupled with the server computer 120 over a network 130, such as the internet.

The client computer 110 includes one or more processors 112, persistent storage 114, such as a hard drive, and a display 116. Processor(s) 112 may include a processor, a microprocessor, an application specific integrated circuit (ASIC), a field programmable gate array (FPGA), or another type of processor that interprets and executes instructions. Persistent storage 114 may include a magnetic storage medium, such as a hard disk drive, or a removable memory, such as a flash memory. Persistent storage 114 may store image data and/or program instructions. Client computer 110 also includes an input device 118, which may include a component that permits a user to input information to client computer 110, such as a control button, a keyboard, a keypad, or another type of input device. Display 116 may include a component that outputs information to the operator, such as a light emitting diode (LED) display, a CRT display, or another type of visual output device.

Client computer 110 may also include a transient memory, which may include a random access memory (RAM) or another type of dynamic storage device that stores information or instructions for execution by processor(s) 112. Client computer 110 may include a communication interface, which may include any transceiver-like component that allows client computer 110 to communicate with other devices, such as server computer 120, or networks. In some examples, the communication interface may include a wireless interface, a wired interface, or a combination of a wireless interface and a wired interface. In some examples, the communication interface may receive image data over a network, such as network 130, e.g., from server computer 130, and may forward the image data for storage in a computer readable storage medium (e.g., persistent storage 114).

The server computer 120 includes one or more processors 122 and persistent storage 124. The client computer 110 and server computer 120 may include additional components other than those explicitly depicted in FIG. 1. Server computer 120 includes one or more processors 122, and persistent storage 124, such as a hard drive. Processor(s) 122 may include a processor, a microprocessor, an application specific integrated circuit (ASIC), a field programmable gate array (FPGA), or another type of processor that interprets and executes instructions. Persistent storage 124 may include a magnetic storage medium, such as a hard disk drive, or a removable memory, such as a flash memory. Persistent storage 124 may store image data and/or program instructions. Server computer 120 may also include an input device, which may include a component that permits a user to input information to server computer 120, such as a control button, a keyboard, a keypad, or another type of input device. Server computer 120 may also include a display, which may include a component that outputs information to the operator, such as a light emitting diode (LED) display, a CRT display, or another type of visual output device.

Server computer 120 may also include a transient memory, which may include a random access memory (RAM) or another type of dynamic storage device that stores information or instructions for execution by processor(s) 122. Server computer 120 may include a communication interface, which may include any transceiver-like component that allows server computer 120 to communicate with other devices, such as client computer 110, or networks. In some examples, the communication interface may include a wireless interface, a wired interface, or a combination of a wireless interface and a wired interface. In some examples, the communication interface may send image data over a network, such as network 130, e.g., to client According to various examples, the server computer 120 may provide image data to the client computer 110. The server computer 120 may store image data for one or more image stacks in its persistent memory 124. The client computer, e.g., executing image stack display software according to various examples, may request image data from the server computer as disclosed herein. The server computer 120 may receive the request, retrieve the image data from persistent storage 124, and provide it to the client computer 110 over the network 130 using network protocols such as TCP/IP. The client computer 110 and server computer 120 may utilize or be consistent with picture archiving and communication system (PACS) and/or digital imaging and communications in medicine (DICOM). The client computer 110 may then display the image data on the display 116 as disclosed herein.

Figure 2:
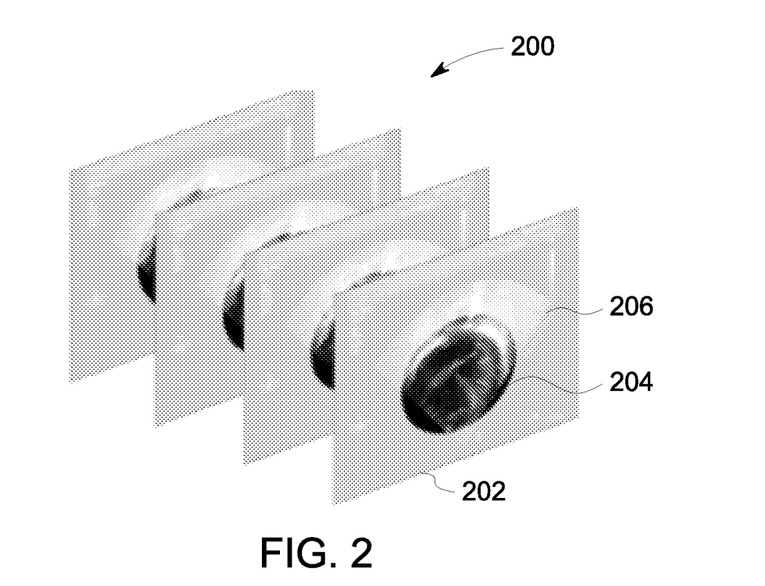
FIG. 2 illustrates an image stack display according to various examples.

FIG. 2 illustrates an image stack display 200 according to various examples. The image stack display represents a temporal sequence of images that may be displayed on a client computer, such as the client computer 110, according to various examples. The image stack display 200 is therefore illustrative of a temporal sequence, whereas in an example, only one image from a given image stack may be displayed at a time.

In general, various types of image stacks are contemplated. As a first example, a medical image stack may be a sequence of two-dimensional image slices through a three-dimensional image obtained using three-dimensional imaging technology such as a magnetic resonance imaging (MRI) device, a positron emission tomography (PET) device, or a computed tomography (CT) device. As a second example, a medical image stack may be a sequence of images captured over an interval of time. Such a sequence of images may be captured over an interval of time using any imaging technique, by way of non-limiting example, two-dimensional imaging techniques such as ultrasound or X-ray, or three-dimensional imaging technotes such as MRI, PET, or CT. For the latter, the sequence of images captured over a period of time using three-dimensional imaging techniques may be two-dimensional projections of three-dimensional images, or may be two-dimensional slices of three-dimensional images. As a specific instance of the second example, a medical image stack may include images of an ultrasound video, e.g., of a human heart. In general, an image stack may include hundreds of two-dimensional images, e.g., 100, 200, 300, 400, 500, 600, 700, 800, 900, etc.

As shown in FIG. 2, the images of the image stack may be displayed in a viewport 202. A client computer user may scroll through the images of an image stack using a variety of techniques. For example, the user may interactively scroll through the images, e.g., by pushing a button on a user interface, with each button push causing a transition from the current image to a second image. As another example, the user may automatically scroll though the images, e.g., by activating an automated scrolling procedure of the display software such as by activating or holding down the same or a different button on the user interface. Such automated scrolling may represent a video sequence in real time, in accelerated time, or in decelerated time, relative to the rate at which the video was captured. Such automated scrolling may represent real-time or cine sequence imaging, for example.

According to various examples, during scrolling, each image of an image stack may be displayed in two portions: a first, high resolution aperture image portion 204, that is shown in an aperture region of a designated aperture, and a second, context image portion 206, that is shown outside of the designated aperture. By way of non-limiting example, the aperture may be a designated portion, e.g., a polygon or any other shape, of an image region. During scrolling, the client computer does not require downloading entire high resolution images of all of the images in the image stack from the server computer. Accordingly, less bandwidth is utilized and the scrolling may proceed without interruption or slowdown. According to some examples, for a plurality of images in the image stack, only high resolution image portions within the designated aperture are downloaded by the client computer from the server computer during scrolling. For the context image portions, the high resolution image data may not be downloaded by the client from the server during scrolling. During scrolling, any of a variety of context image portions may be downloaded and displayed, some of which are shown and described in reference to FIG. 2.

When scrolling stops, the entire currently displayed image may be fully rendered in high resolution according to various examples, including the image portion inside the designated aperture and the image portion outside the designated aperture. According to various examples, scrolling may be determined to stop for purposes of rendering the entire currently displayed image in high resolution when automated scrolling is deactivated or when interactive scrolling pauses for a predetermined time interval, such as by way of non-limiting examples, 100 ms, 200 ms, 300 ms, 400 ms, 500 ms, 600 ms, 700 ms, 800 ms, 900 ms, or 1 s. According to various examples, if images transition within such an interval, the image stack is considered to be scrolling.

The aperture may be designated using any of a variety of techniques according to various examples. According to some examples, the aperture is designated interactively by the user, e.g., by the user tracing an image portion using a graphical user interface. According to some examples, the user may designate the aperture on an initial image of the image stack, e.g., by using a graphical user interface tool to circumscribe or cover an area that defines the initial aperture shape and location for the image stack. According to some examples, the user may designate the aperture so as to encompass the clinically significant region of the image.

According to some examples, the aperture is designated automatically using any of a variety of techniques. By way of non-limiting example, according to some examples, an automated background identification technique is applied to a plurality of images (e.g., all images) in the image stack. Such an automated background identification technique may identify a portion of the images that remains unchanged or essentially unchanged among the plurality of images. The remainder of the image portion may then represent the portion of the images in the image stack that change among the plurality of images, and may be automatically designated as being included in the aperture.

According to some examples, the aperture may be designated automatically by using an image statistic algorithm. Such an algorithm may partition a plurality of images (e.g., all images) in the image stack into parts, e.g., a grid of square or rectangular parts. The algorithm may determine correlations among the parts among the plurality of images. Parts having a high correlation value, e.g., over a predetermined correlation threshold, may represent image parts that remains unchanged or essentially among the plurality of images. The remainder of the image parts may then represent the parts of the images in the image stack that change among the plurality of images, and may be automatically designated as being included in the aperture.

According to some examples, an initial aperture is designated using any of the above techniques, and then the location and/or shape of the aperture is interactively or automatically adjusted for various images in the image stack. Such adjustment may occur during scrolling, or during a pause in, or stoppage of, scrolling.

For an interactively adjusted aperture, according to some examples, an aperture may be designated on an initial, e.g., first image in an image stack, and a user may designate one or more additional apertures on additional respective additional image(s) in the image stack. The aperture on other images of the image stack for which the user did not explicitly designate an aperture may then be interpolated from the user-designated apertures.

For an automatically adjusted aperture, according to some examples, an artificial intelligence (AI) technique such as artificial intelligence object detection, may be applied to track the portion of the image in the initial aperture among the other images in the image stack. Thus, artificial intelligence can be applied to track the changing image portion by dynamically moving and/or reshaping the aperture between adjacent images within an image stack, e.g., by tracking similar content structures. In this manner, the aperture may be automatically designated by using artificial intelligence to track a location of an aperture region among the images of the image stack.

Figure 3:
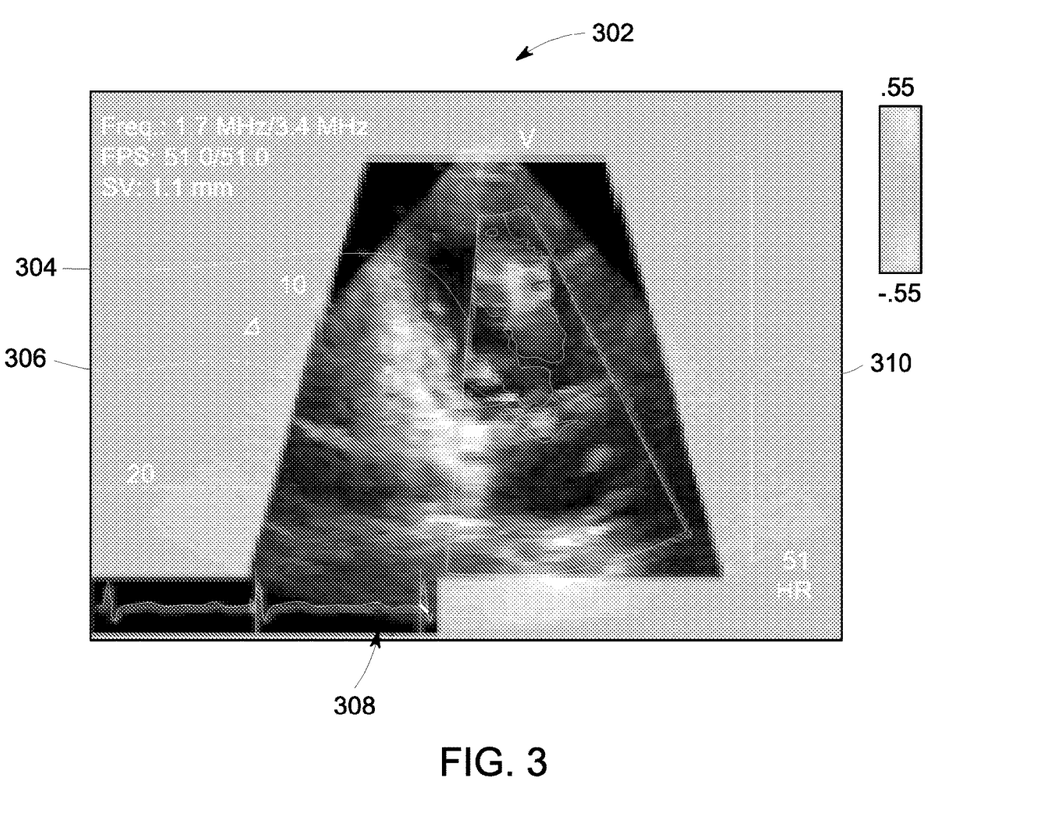
FIG. 3 illustrates an image display according to various examples.

FIG. 3 illustrates an image display 302 according to various examples. Image display 302 represents a cardiac ultrasound image 310 from a dynamic image stack and also an ECG 308. Image display 302 may be shown on a client computer, such as client computer 110 as shown and described herein in reference to FIG. 1. In general, according to various examples, during scrolling, the context portion of images in an image stack are displayed in a way that does not require obtaining high resolution image data by the client from the server for all of the context image portions.

As shown in the image display 302, some examples display a single high resolution context image portion of one of the images in the image stack, e.g., an initial image, for multiple images in the image stack. Thus, the same context image portion may be displayed in high resolution for multiple images in the image stack. As shown in the image display 302, the aperture image portion 304 in the aperture region changes during scrolling to display, in high resolution, image portions of multiple images in the image stack throughout the scrolling, while the context image portion 306 of the images remains the same, e.g., in high resolution, for the multiple images in the image stack. According to some examples, during scrolling, while high resolution image portions within the aperture region are obtained from the server by the client for multiple images in the image stack, only a single, or a reduced number, of high resolution context image portions outside of the aperture region are obtained from the server by the client for the same multiple images of the image stack. During scrolling, a single high resolution context image portion may be displayed during the entirety of the scrolling, or multiple, but not all, high resolution context image portions may be displayed during the entirety of the scrolling, e.g., the high resolution image portion may be downloaded by the client from the server and displayed at periodic intervals, such as one for every 10, 20, 50, 100, etc., images. The ECG 308 may be updated dynamically during scrolling.

Figure 4:
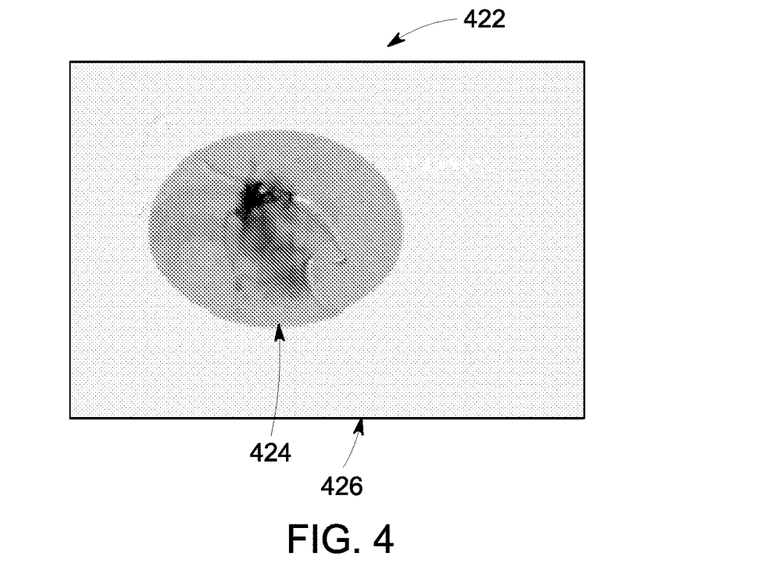
FIG. 4 illustrates an image display with an oval aperture shape according to various examples.

FIG. 4 illustrates an image display with an oval aperture shape according to various examples. Image display 302 represents a cardiac ultrasound image from a dynamic image stack. Image display 302 may be shown on a client computer, such as client computer 110 as shown and described herein in reference to FIG. 1. Image display 422 represents a contrast injected x-ray image of a dynamic image stack. The context portion is displayed in a way that does not require obtaining high resolution image data by the client from the server for all of the context image portions.

As shown in the image display 422, some examples display the context image portions in low resolution for multiple, e.g., all, images in the image stack. The aperture image portion 424 inside the aperture region may be obtained by the client from the server in high resolution and displayed in high resolution by the client for multiple, e.g., each, image in the image stack during scrolling. The context image portion 426 outside the aperture region may be obtained from the server in low resolution and displayed in low resolution by the client for multiple, e.g., each, image in the image stack during scrolling. Thus, different context image portions may be displayed in low resolution for each respective image in the image stack. As shown in the image display 422, the image portion in the aperture region changes during scrolling to display, in high resolution, image portions of multiple images in the image stack throughout the scrolling, whereas the context image portion 426 of the images is shown in low resolution.

Examples can combine the retrieval and display techniques shown and described herein in reference to FIGS. 3 and 4. According to some examples, during scrolling, while high resolution image portions within the aperture region are obtained from the server by the client for multiple images in the image stack, only a single, or a reduced number, of high or low resolution context image portions outside of the aperture region are obtained from the server by the client for the same multiple images of the image stack. During scrolling, a single high or low resolution context image portion may be displayed during the entirety of the scrolling, or multiple, but not all, high or low resolution context image portions may be displayed during the entirety of the scrolling, e.g., the high or low resolution image portion may be downloaded by the client from the server and displayed at periodic intervals, such as one for every 10, 20, 50, 100, etc., images.

According to some examples, the context image portion may be omitted entirely from retrieval and display. Instead, a blank area, or an area with a single color, e.g., black, white, or grey, may be displayed in the context image portion.

Figure 5:
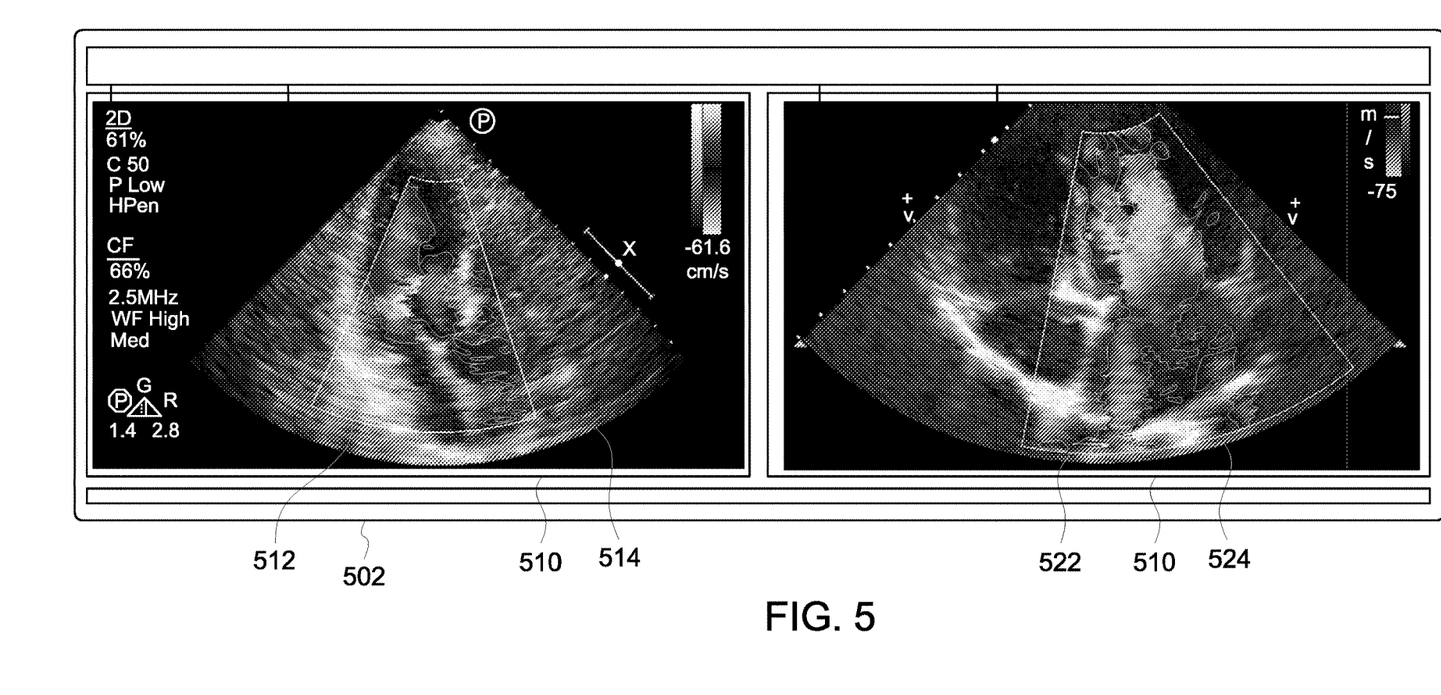
FIG. 5 illustrates an image display with two ultrasound viewports according to various examples.

FIG. 5 illustrates an image display 502 with two ultrasound viewports 510, 520 according to various examples. Image display 502 represents two cardiac ultrasound images from respective dynamic image stacks. Image display 502 may be shown on a client computer, such as client computer 110 as shown and described herein in reference to FIG. 1. The context portion is displayed in a way that does not require obtaining high resolution image data by the client from the server for all of the context image portions.

As shown in FIG. 5, the first viewport 510 displays a cardiac ultrasound with a high resolution aperture image portion 512 and a context image portion 514. The second viewport 520 displays a cardiac ultrasound with a high resolution aperture image portion 522 and a context image portion 524. The first viewport 510 and the second viewport 510 may display cardiac image stacks from the same patient, or from different patients.

In general, two viewports may be shown simultaneously on a client computer for a variety of reasons according to various examples. Some examples may show two view ports to show different data types, such as are shown and described herein in reference to FIG. 3. Some examples may show a dynamic image in one viewport, e.g., viewport 510, and a static image in another viewport, e.g., viewport 520. Some examples may show a reference dynamic image (e.g., an image with a normal physiology) in one view port, e.g., viewport 520, and an image subject to analysis or evaluation in another viewport, e.g., viewport 520. Some examples may show dynamic images from the same image stack, but at different timeframes, e.g., an earlier timeframe in viewport 510 and a later timeframe in viewport 520. Some examples may show dynamic images from two different image stacks for the same patient, e.g., an image from a first image stack for a first anatomical feature in viewport 510, and an image from a second image stack for a second anatomical feature in viewport 520.

According to various examples, any of a variety of techniques may be used to define and obtain the low resolution data shown in context image portions. Some examples may store or render data for images in an image stack progressively, from low resolution to increasingly high resolution, to a final high resolution image. For example some image compression technique, such as Gaussian or Laplacian image compression, and progressive image codecs, store images at multiple levels of resolution. According to some examples, image data at a resolution lower than that of the final high resolution image may be obtained from the server by the client for display by the client in the context image portion.

Figure 6:
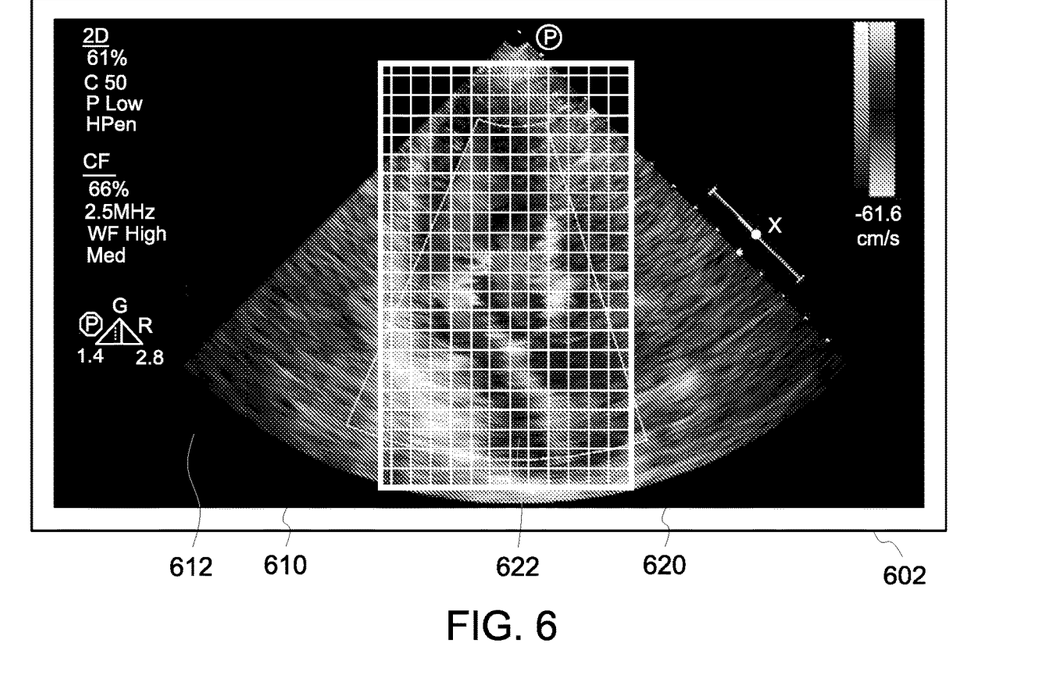
FIG. 6 illustrates an image display with multi-level progressive rendering and a rectangular aperture according to various examples.

FIG. 6 illustrates an image display 602 with multi-level progressive rendering and a rectangular aperture 620 according to various examples. The image display 616020 may represent a dynamic image shown in a viewport from an image stack according to various examples. Image display 602 includes a high resolution aperture image portion in the aperture region of the rectangular aperture 620 and a low resolution image portion in the context image portion 610. The aperture image portion 620 is overlaid with a fine grid that includes constituent image squares such as image square 622, and the context image portion 610 is overlaid with a coarse grid that include constituent image squares such as image square 612. The grids represent progressive image storage and/or rendering. Each square 612, 622 schematically represents a respective rendering resolution from a progressive rendering scheme. Thus, the squares, such as square 612, from the coarse grid are larger than the squares, such as square 622, from the fine grid, so as to represent that the context image portion outside of the aperture region of aperture 620 is downloaded and rendered with a lower resolution than that of the high resolution image portion inside of aperture 620.

Thus, during dynamic rendering for example, e.g., cine sequence play or scrolling, pixel data for the high resolution image portion inside of the aperture region of aperture 620 may be downloaded with high resolution, and pixel data for the context image portion outside of the aperture region of aperture 620 can be downloaded with lower resolution, or even blacked out without being downloaded. Then when cine or scroll stops, additional resolution of pixel data can be downloaded progressively, to recover high resolution across the entire image when still image is displayed.

Various progressive resolution image storage and rendering schemes are amenable to the technique shown and described herein in reference to FIG. 6. Such image storage and rendering schemes may facilitate the multi-grid and multi-resolution image data encoding and progressive data download. Any of a variety of such techniques exist, both standard and proprietary, such as, by way of non-limiting example, JPEG2000, HTJ2K, and JPEG-XL. Techniques may store images as a series of images in different resolutions. In general, suitable techniques are those that facilitate progressive image rendering. Progressive image rendering may include initially displaying an image with a low resolution, e.g., in highly pixelated form, which may correspond to the coarse grid shown and described in reference to FIG. 6. As the image is further rendered, the display is replaced with the same image rendered in one or more increasing resolution versions.

Although FIG. 6 shows two grid resolutions, with a coarse grid and a fine grid, examples may utilize progressive image storage and rendering with any number of different resolutions, not limited to two. However, two different resolutions may be selected for the high resolution image portion displayed within the aperture region of aperture 620 and for the low resolution context image portion outside of the aperture region of aperture 620. Any two resolutions supported by the image storage format may be used, with the low resolution for the context image portion lower than the high resolution for aperture image portion, where the high resolution is higher than, but not necessarily the highest resolution possible for a given stored image file, that of the low resolution selected.

Figure 7:
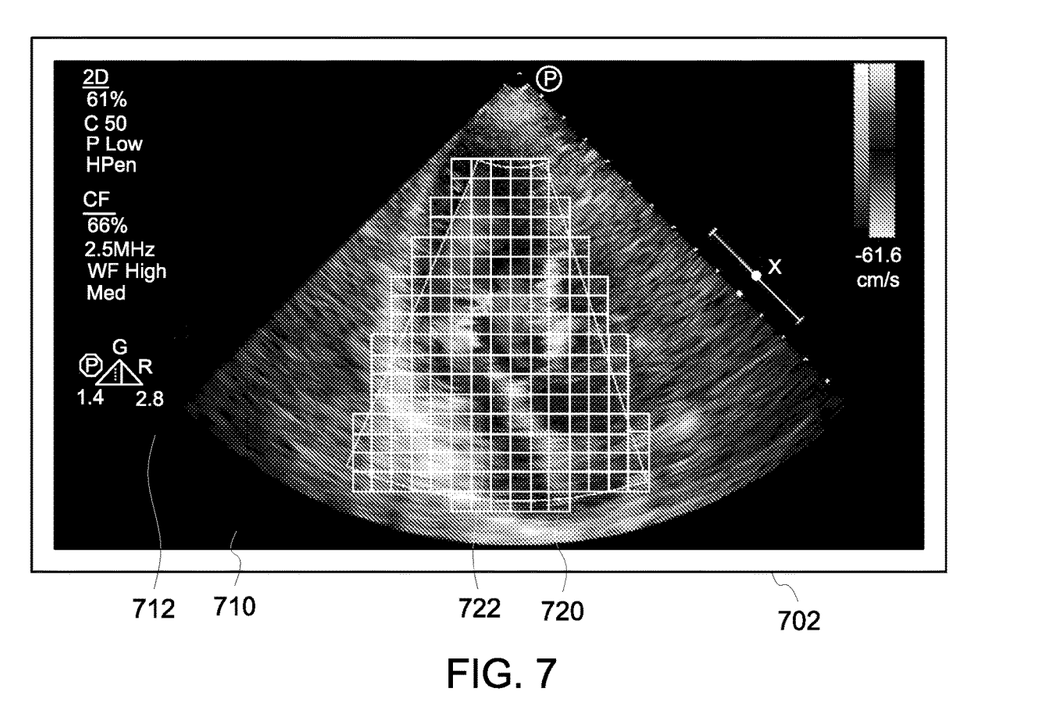
FIG. 7 illustrates an image display with multi-level progressive rendering and a fan shaped aperture according to various examples.

FIG. 7 illustrates an image display 702 with multi-level progressive rendering and a fan shaped aperture 720 according to various examples. The image display 710 may represent a dynamic image shown in a viewport from an image stack according to various examples. Image display 710 includes a high resolution aperture image portion in the aperture region of fan-shaped aperture 720 and a low resolution image portion in the context image portion 710, outside of aperture region of the fan-shaped aperture 720. The fan-shaped aperture image portion 720 is shown overlaid with a fine grid that includes constituent image squares such as image square 722, and the context image portion 710 is overlaid with a coarse grid that include larger image squares such as image square 712. As in FIG. 6, the grids of FIG. 7 represent progressive image storage and/or rendering. Each square 712, 722 schematically represents a respective rendering resolution from a progressive rendering scheme. Thus, the squares, such as square 712, from the coarse grid are larger than the squares, such as square 722, from the fine grid, so as to represent that the context image portion outside of fan-shaped aperture 720 is downloaded and rendered with a lower resolution than that of the high resolution image portion inside of the aperture region of fan-shaped aperture 720.

Figure 8:
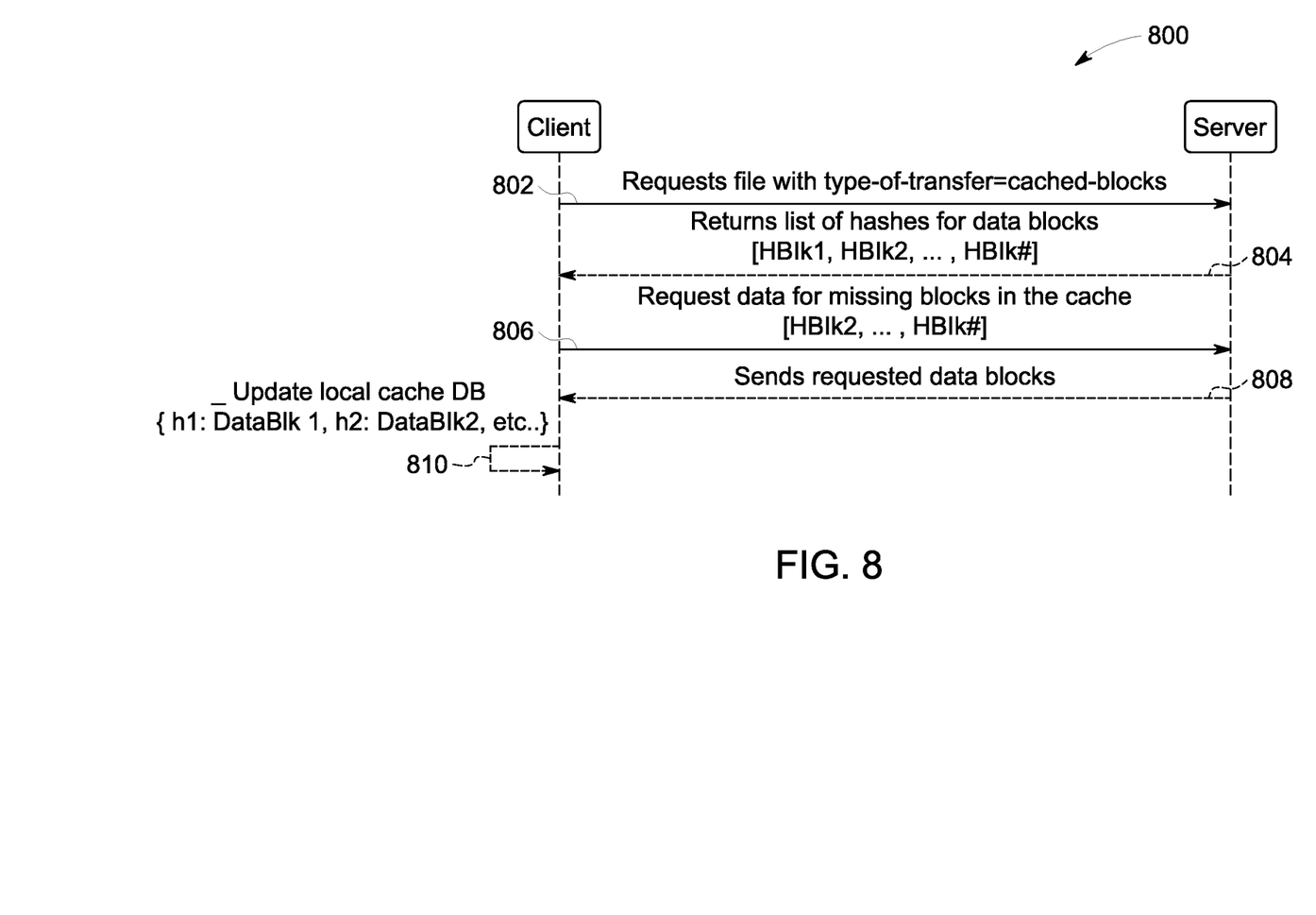
FIG. 8 is a communications diagram for a method of image data retrieval according to various examples.

FIG. 8 is a communications diagram for a method 800 of image data retrieval according to various examples. The method 800 may be implemented as part of the method 800. More particularly, according to various examples, during scrolling, either or both of the high resolution image data within the aperture region or the context image data outside the aperture region may be retrieved by the client from the server using the method 800. Thus, the method 800 may be implemented using a client computer, such as client computer 110, and a server computer, such as the server computer 120, as shown and described herein in reference to FIG. 1.

For communication 802, the client requests image data from the server. The request may specify that the image data is to be provided using the method 800, e.g., by including a designation of "type-of-transfer-cached-blocks." The request may be made during scrolling images in an image stack by display software at a client computer. The request may be for image data for the next image in the scrolling, e.g., one or both of high resolution image data within the aperture region or the context image data outside the aperture region. The request may be made at any of a variety of protocol levels, e.g., using TCP/IP. The request may include an identification of the requested data, e.g., an identification of a particular image or images in an image stack, or a particular image portion or portions of one or more images in an image stack. The identification may include one or more file names, for example.

For communication 804, the server responds to the client by providing a list of hashes of image block data for the requested image(s) or image portion(s). In general, for the method 800, image data is stored by being broken down into blocks of various sizes, where each block is stored with a hash of the block as an index. Blocks may correspond to image portions, for example. In general, block sizes may be determined by the server based on an analysis of file types, size, repeated segments, etc. The analysis may be implemented using logic that may reduce (e.g., minimize) the number of blocks that can cover a large amount of (e.g., maximize) data within or across files. The server can store the blocks with the hashes included in the respective file names, so that a sequence of hashes of individual blocks may represent a full file of the blocks. Thus, for communication 804, the server provides a list of hashes for blocks of the image data requested by the client.

For communication 806, the client determines which blocks it requires by searching its cached data to identify any blocks that have already been obtained from the server and sends a request for any missing blocks to the server. The request may specify the hash values of the missing blocks of image data. The specified hash values may be a subset of the hash values received at action 804.

For communication 808, the server responds with the requested image data blocks. The data may be sent at any protocol level, e.g., TCP/IP.

For action 810, the client updates its local cache databased with the hashes for the received blocks. Consequently, over time, the client builds up a cache of image data blocks and their identifying hashes. For subsequent client requests, no data transfer is needed for data blocks that are already cached by the client.

Figure 9:
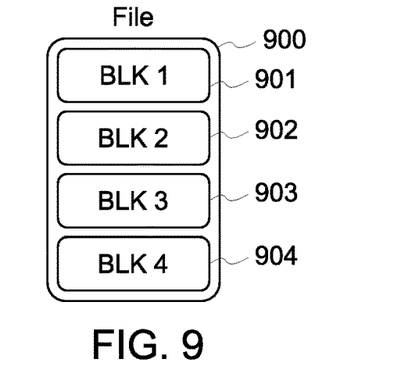
FIG. 9 is a schematic diagram of an example server side file storage, where each block of the file is the same size, according to various examples.

FIG. 9 is a schematic diagram of an example server side file 900 storage, where each block 901, 902, 903, 904 of the file 900 is the same size, according to various examples. The example server side file 900 storage may be utilized with the method 800 as shown and described herein in reference to FIG. 8. The server side file 900 storage may be utilized by a server computer, such as server computer 120, as part of a system, such as system 100, shown and described herein in reference to FIG. 1.

As shown in FIG. 9, the file 900 includes multiple blocks 901, 902, 903, 904. According to some examples, each block 901, 902, 903, 904 is a fixed size. The fixed size may be selected by dividing the size of the file 900 by an integer such that the resulting number is the size of the blocks 901, 902, 903, 904. If the size of the file 900 is not divisible by the selected integer, one block, e.g., the last block 904 may be a different, e.g., smaller size, or may be padded with data that is not used by the file 900. According to some embodiments, the server, e.g., server 120, can choose a default block size. According to some examples, the server, e.g., server 102 may allow a user to select a block size. According to some examples, a user of the client, e.g., client 110, may specify the block size, e.g., based on their usage scenario. The file 900 storage with a single block size could be implemented for optimizing single file download use cases.

According to various examples, the client computer, e.g., client computer 110, caches blocks, such as blocks 901, 902, 903, 904 of a file 900, such as an image file, that it downloads from the server, such as server 120. Using the techniques disclosed herein, e.g., as shown and described herein in reference to FIG. 8, when the client computer is to display an additional image, or image portion, with a corresponding image data file that utilizes block storage, it may omit downloading blocks that it already has cached.

Figure 10:
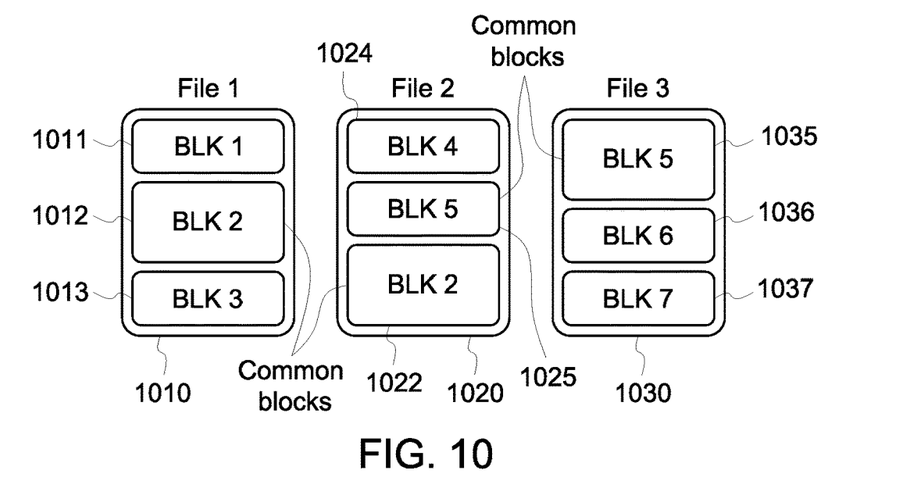
FIG. 10 is a is a schematic diagram of example server side file storage, where blocks of the file differ in size, according to various examples.

FIG. 10 is a is a schematic diagram of example server side file 1010, 1020, 1030 storage, where the blocks 1011, 1012, 1013, 1022, 1024, 1025, 1035, 1036, 1037 of the files 1010, 1020, 1030 differ in size, according to various examples. The example server side file 1010, 1020, 1030 storage may be utilized with the method 800 as shown and described herein in reference to FIG. 8. The server side file 1010, 1020, 1030 storage may be utilized by a server computer, such as server computer 120, as part of a system, such as system 100, shown and described herein in reference to FIG. 1.

In particular, FIG. 10 depicts three files 1010, 1020, 1030. File 1010 includes 1011, 1012, and 1013; file 1020 includes blocks 1022, 1024, and 1025, and file 1030 includes blocks 1035, 1036, and 1037. In the example illustrated in reference to FIG. 10, the size of blocks 1011, 1012, 1013, 1022, 1024, 1025, 1035, 1036, 1037 are allowed to vary. As shown in FIG. 10, file 1010 includes blocks 1011 and 1013 of a first size, and a block 1012 of a second, larger, size. File 1020 includes a block 1024 of a first size, the same size as blocks 1011 and 1013. File 1020 also includes block 1022, which is identical to, and therefore the same size as, block 1012 of file 1010. File 1020 also includes block 1025, which has a size intermediate between the sizes of blocks 1024 and 1022. File 1030 includes blocks 1036 and 1037, which are the same size as, but include different data from, blocks 1011, 1013, and 1024. File 1030 also includes block 1035, which is identical to, and therefore the same size as, block 1025 of file 1020.

According to some examples, the server identifies the large, e.g., the largest possible, common blocks across files 1010, 1020, 1030. Calculations between the files 1010, 1020, 1030 may be used to identify such a size. Examples may use the variable block 1011, 1012, 1013, 1022, 1024, 1025, 1035, 1036, 1037 of the files 1010, 1020, 1030 size file storage of FIG. 10 where multiple file transfers are expedited, e.g., optimized. For a given file, e.g., any of files 1010, 1020, 1030, if there are no common blocks of size larger than a threshold value, the server could fall back to the previous option of fixed-size block storage as shown and described herein in reference to FIG. 9.

Figure 11:
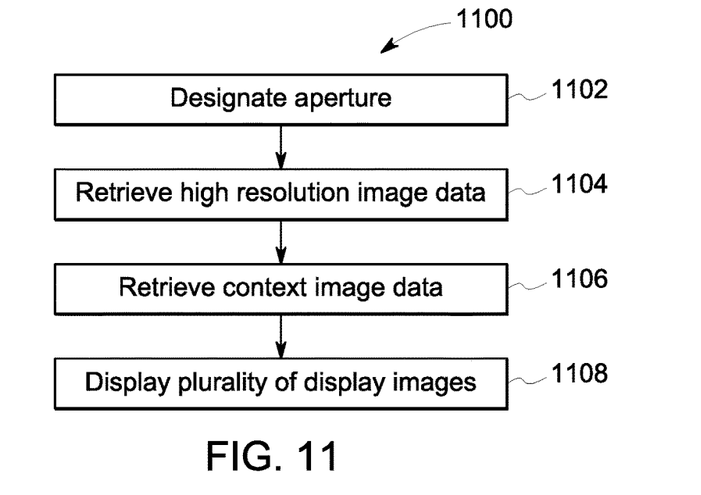
FIG. 11 is a flowchart for a method of medical image stack retrieval from a server computer and display by a client computer according to various examples.

FIG. 11 is a flowchart for a method 1100 of medical image stack retrieval from a server computer and display by a client computer according to various examples. The method 1100 may be implemented using a client computer, such as client computer 110, and a server computer, such as server computer 120, as shown and described herein in reference to FIG. 1. The method 1100 may utilize the method 400 as shown and described herein in reference to FIG. 4. The method 400 may include usage of the method 800 as shown and described herein in reference to FIG. 8. The method may be implemented with or consistent with PACS and/or DICOM viewers.

At operation 1102, the method 1100 includes designating, at the client computer, an aperture for viewing the image stack. The aperture may be designated as shown and described herein in reference to FIG. 2, by way of non-limiting example. In general, the aperture may be designated interactively by a user or automatically.

At operation 1104, the method 1100 includes retrieving, by the client computer and from the server computer, high resolution image data for inside a respective aperture region of each of a plurality of images of the image stack. By way of non-limiting example, the high resolution image data may be retrieved using the method 400 as shown and described herein in reference to FIG. 4. The high resolution image data may be aperture image data, as shown and described herein in reference to FIGS. 2, 3, 4, 5, 6, and 7, by way of non-limiting examples.

At operation 1106, the method 1100 includes retrieving, by the client computer and from the server computer, context image data for outside a respective aperture region for each of the plurality of images of the image stack. The context image data may be retrieved using the method 400 as shown and described herein in reference to FIG. 4, by way of non-limiting example. The context image data may be as shown and described herein in reference to FIGS. 2, 3, 4, 5, 6, and 7, by way of non-limiting examples. Note that according to various examples, the retrieval of context image data of operation 1106 occurs less frequently than the retrieval of high resolution image data of operation 1104.

At operation 1108, the method 1100 includes displaying, by the client computer, a plurality of display images derived from the plurality of images of the image stack. Each of the display images may include a high resolution image portion inside a respective aperture region that corresponds to the high resolution image data retrieved at operation 1104. Each of the display images may include a context image portion outside the respective aperture region that corresponds to the context image data retrieved at operation 1106. The display may be as shown and described herein in reference to FIGS. 2, 3, 4, 5, 6, and 7 by way of non-limiting example.

Certain examples can be performed using a computer program or set of programs. The computer programs can exist in a variety of forms both active and inactive. For example, the computer programs can exist as software program(s) comprised of program instructions in source code, object code, executable code or other formats; firmware program(s), or hardware description language (HDL) files. Any of the above can be embodied on a transitory or non-transitory computer readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented using computer readable program instructions that are executed by a processor, e.g., processor(s) 112 and/or processors 122.

These computer readable program instructions may be provided to a processor of a general-purpose computer, special purpose computer, or other programmable data processing apparatus, e.g., client computer 110 and/or server computer 120, to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

In embodiments, the computer readable program instructions may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the C programming language or similar programming languages. The computer readable program instructions may execute entirely on a user's computer, partly on the user's computer, as a stand-alone software package, partly on the user's computer and partly on a remote computer or entirely on the remote computer or server.

As used herein, the terms "A or B" and "A and/or B" are intended to encompass A, B, or {A and B}. Further, the terms "A, B, or C" and "A, B, and/or C" are intended to encompass single items, pairs of items, or all items, that is, all of: A, B, C, {A and B}, {A and C}, {B and C}, and {A and B and C}. The term "or" as used herein means "and/or."

As used herein, language such as "at least one of X, Y, and Z," "at least one of X, Y, or Z," "at least one or more of X, Y, and Z," "at least one or more of X, Y, or Z," "at least one or more of X, Y, and/or Z," or "at least one of X, Y, and/or Z," is intended to be inclusive of both a single item (e.g., just X, or just Y, or just Z) and multiple items (e.g., {X and Y}, {X and Z}, {Y and Z}, or {X, Y, and Z}). The phrase "at least one of" and similar phrases are not intended to convey a requirement that each possible item must be present, although each possible item may be present.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. § 112(f). However, for any claims containing elements designated in any other manner, it is intended that such elements are not to be interpreted under 35 U.S.C. § 112(f).

While the invention has been described with reference to the exemplary examples thereof, those skilled in the art will be able to make various modifications to the described examples without departing from the true spirit and scope. The terms and descriptions used herein are set forth by way of illustration only and are not meant as limitations. In particular, although the method has been described by examples, the steps of the method can be performed in a different order than illustrated or simultaneously. Those skilled in the art will recognize that these and other variations are possible within the spirit and scope as defined in the following claims and their equivalents.

What is claimed is:

1. A method of medical image stack retrieval from a server and display by a client, the method comprising:
    designating, at the client, an aperture for viewing the medical image stack;
    retrieving, by the client and from the server, high resolution image data for inside a respective aperture region of each of a plurality of images of the medical image stack, wherein the retrieving the high resolution image data restricts an amount of image data downloaded from the server when retrieving the medical image stack by applying, as part of the retrieval, the respective aperture region to each of the plurality of images;
    retrieving, by the client and from the server, context image data for outside the respective aperture region for each of the plurality of images of the medical image stack to enable scrolling through the plurality of images of the medical image stack without latency due to downloading additional data corresponding to the medical image stack, wherein the scrolling provides a temporal-distortion-free playback of image sequences from the plurality of images with a high acquisition rate;
    displaying, by the client, a plurality of display images derived from the plurality of images of the medical image stack, each of the display images comprising a high resolution image portion inside the respective aperture region and a context image portion outside the respective aperture region, wherein the high resolution image portion corresponds to the high resolution image data and the context image portion corresponds to the context image data, wherein the plurality of display images comprising the high resolution image portion and the context image portion are displayed during scrolling;
    detecting when scrolling through the plurality of display images stops; and
    displaying one of the plurality of display images with the high resolution image portion within the aperture region as well as a high resolution image portion corresponding to the context image portion outside the aperture region.

2. The method of claim 1, wherein at least one of the retrieving the high resolution image data or the retrieving context image data comprises:
  sending, from the client to the server, a request for image data;
  receiving, by the client from the server, a plurality of hash values corresponding to a plurality of image portions;
  determining, by the client, a subset of the plurality of hash values corresponding to image portions not cached by the client;
  sending, from the client to the server, the subset of the plurality of hash values; and
  receiving, by the client from the server, data for a plurality of image portions corresponding to the subset of the plurality of hash values.

3. The method of claim 1, wherein the medical image stack comprises a sequence of three dimensional imaging slices.

4. The method of claim 1, wherein the displaying comprises displaying a cine sequence of the plurality of display images.

5. The method of claim 1, wherein the designating the aperture comprises receiving a graphical user designation.

6. The method of claim 1, wherein the designating the aperture comprises automatically designating the aperture.

7. The method of claim 6, wherein the automatically designating the aperture comprises automated background identification to identify a context image portion outside respective aperture regions.

8. The method of claim 6, wherein a location of the respective aperture region changes among the plurality of display images.

9. The method of claim 8, wherein the automatically designating the aperture further comprises tracking, using artificial intelligence, a location of the respective aperture region among the plurality of images of the medical image stack.

10. The method of claim 1, wherein the context image portion comprises a fixed high resolution image portion for multiple of the display images.

11. The method of claim 1, wherein the context image portion comprises a low resolution image portion of a respective image of the medical image stack.

12. A system for medical image stack retrieval from a server and display by a client computer, the system comprising the client computer, the client computer comprising an electronic processor and persistent storage comprising instructions that, when executed by the electronic processor, cause the electronic processor to perform actions comprising:
  designating, at the client computer, an aperture for viewing the medical image stack;
  retrieving, by the client computer and from the server, high resolution image data for inside a respective aperture region of each of a plurality of images of the medical image stack, wherein the retrieving the high resolution image data restricts an amount of image data downloaded from the server when retrieving the medical image stack by applying, as part of the retrieval, the respective aperture region to each of the plurality of images;
  retrieving, by the client computer and from the server, context image data for outside the respective aperture region for each of the plurality of images of the medical image stack to enable scrolling through the plurality of images of the medical image stack without latency due to downloading additional data corresponding to the medical image stack, wherein the scrolling provides a temporal-distortion-free playback of image sequences from the plurality of images with a high acquisition rate;
  displaying, by the client computer, a plurality of display images derived from the plurality of images of the medical image stack, each of the display images comprising a high resolution image portion inside the respective aperture region and a context image portion outside the respective aperture region, wherein the high resolution image portion corresponds to the high resolution image data and the context image portion corresponds to the context image data;
  detecting when scrolling through the plurality of display images stops; and
  displaying one of the plurality of display images with the high resolution image portion within the aperture region as well as a high resolution image portion corresponding to the context image portion outside the aperture region, wherein, when scrolling through the plurality of display images stops, the aperture region and context image portion outside the aperture region are designated automatically using artificial intelligence among the plurality of images of the medical image stack.

13. The system of claim 12, wherein at least one of the retrieving the high resolution image data or the retrieving context image data comprises:
  sending, from the client computer to the server, a request for image data;
  receiving, by the client computer from the server, a plurality of hash values corresponding to a plurality of image portions;
  determining, by the client computer, a subset of the plurality of hash values corresponding to image portions not cached by the client computer;
  sending, from the client computer to the server, the subset of the plurality of hash values; and
  receiving, by the client computer from the server, data for a plurality of image portions corresponding to the subset of the plurality of hash values.

14. The system of claim 12, wherein the medical image stack comprises a sequence of three dimensional imaging slices.

15. The system of claim 12, wherein the displaying comprises displaying a cine sequence of the plurality of display images.

16. The system of claim 12, wherein the designating the aperture comprises receiving a graphical user designation.

17. The system of claim 12, wherein the designating the aperture comprises automatically designating the aperture.

18. The system of claim 17, wherein the automatically designating the aperture comprises automated background identification to identify a context image portion outside respective aperture regions.

19. The system of claim 17, wherein a location of the respective aperture region changes among the plurality of display images.

20. The system of claim 12, wherein the context image portion comprises a fixed high resolution image portion for multiple of the display images.

21. The system of claim 12, wherein the context image portion comprises a low resolution image portion of a respective image of the medical image stack.

\* \* \* \* \*